United States Patent
Kells

(10) Patent No.: US 9,316,847 B1
(45) Date of Patent: Apr. 19, 2016

(54) CLIP FOR HOLDING EYEGLASSES TO A HAT

(71) Applicant: Rebecca A. Kells, Middleboro, MA (US)

(72) Inventor: Rebecca A. Kells, Middleboro, MA (US)

(*) Notice: Subject to any disclaimer, the term of this patent is extended or adjusted under 35 U.S.C. 154(b) by 0 days.

(21) Appl. No.: 14/493,460

(22) Filed: Sep. 23, 2014

(51) Int. Cl.
*G02C 3/00* (2006.01)
*G02C 3/02* (2006.01)

(52) U.S. Cl.
CPC .................................. *G02C 3/02* (2013.01)

(58) Field of Classification Search
CPC .......... G02C 3/00; G02C 3/003; G02C 3/006; G02C 3/02; G02C 3/04
USPC ........ 351/155–157; 248/309.1, 316.7; 24/3.3; 224/251
See application file for complete search history.

(56) References Cited

U.S. PATENT DOCUMENTS

| | | | |
|---|---|---|---|
| 6,481,059 B2 | 11/2002 | Morris | |
| 6,533,414 B2 * | 3/2003 | Newler | G02C 3/04 |
| | | | 224/251 |
| D619,360 S | 7/2010 | Ledford | |
| 7,866,813 B2 | 1/2011 | Anhalt | |
| 7,954,943 B2 | 6/2011 | Ledford | |
| 8,381,359 B1 | 2/2013 | McArdle | |
| 2007/0022573 A1 * | 2/2007 | Cheng | A45C 11/04 |
| | | | 24/3.3 |
| 2012/0272483 A1 | 11/2012 | Moore | |

FOREIGN PATENT DOCUMENTS

WO WO0246828 6/2002

* cited by examiner

*Primary Examiner* — Ricky Mack
*Assistant Examiner* — Robert E Tallman

(57) ABSTRACT

The eyewear storage assembly includes a clip. The clip has an exterior edge extending between a top side and a bottom side of the clip. The clip may be coupled to an article of head gear. A tab is coupled to the clip. The eyewear is positioned between the tab and the article of headgear. The eyewear is retained on the article of headgear for storage.

13 Claims, 4 Drawing Sheets

CLIP FOR HOLDING EYEGLASSES TO A HAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of clips for holding eyeglasses, more specifically, clips for holding eyeglasses to a hat.

SUMMARY OF THE INVENTION

An embodiment of the disclosure meets the needs presented above by generally comprising a clip. The clip has an exterior edge extending between a top side and a bottom side of the clip. The clip may be coupled to an article of head gear. A tab is coupled to the clip. Eyewear is positioned between the tab and the article of headgear. The eyewear is retained on the article of headgear for storage.

An object of the invention is to provide a device that is clip for holding eyeglasses to a hat.

These together with additional objects, features and readily apparent to those of ordinary skill in the art upon reading the following detailed description of presently preferred, but nonetheless illustrative, embodiments of the clip for holding eyeglasses to a hat when taken in conjunction with the accompanying drawings.

In this respect, before explaining the current embodiments of the clip for holding eyeglasses to a hat in detail, it is to be understood that the clip for holding eyeglasses to a hat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the clip for holding eyeglasses to a hat.

It is therefore important that the claims be regarded as including such equivalent construction insofar as they do not depart from the spirit and scope of the clip for holding eyeglasses to a hat. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

Figure 1:
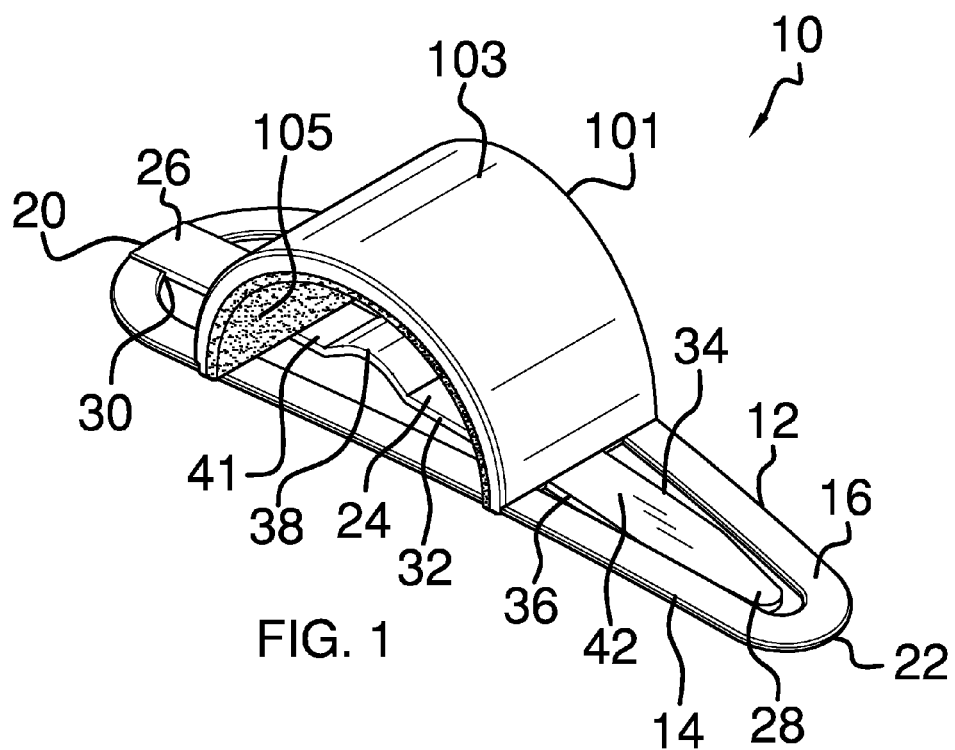
FIG. 1 is a perspective view of an eyewear storage assembly according to an embodiment of the disclosure.
Figure 2:
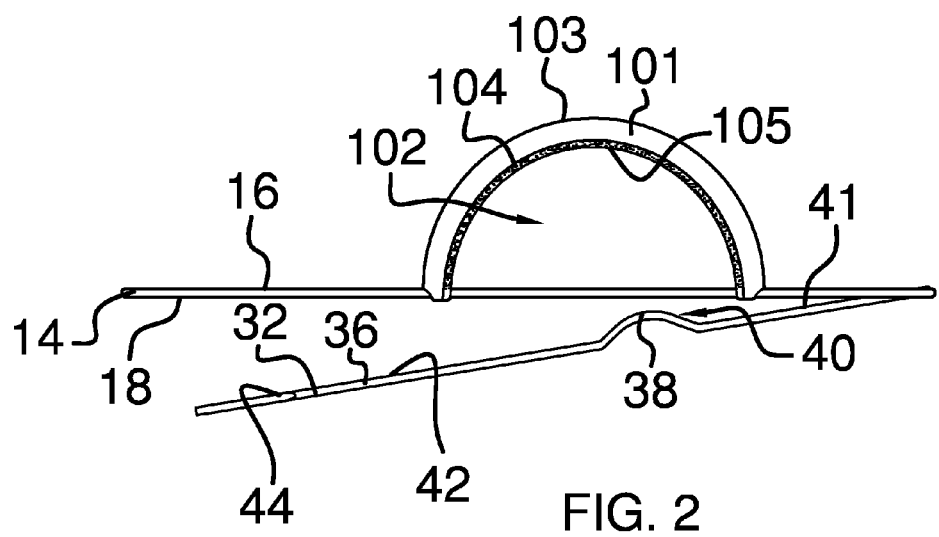
FIG. 2 is a right side view of an embodiment of the disclosure.
Figure 3:
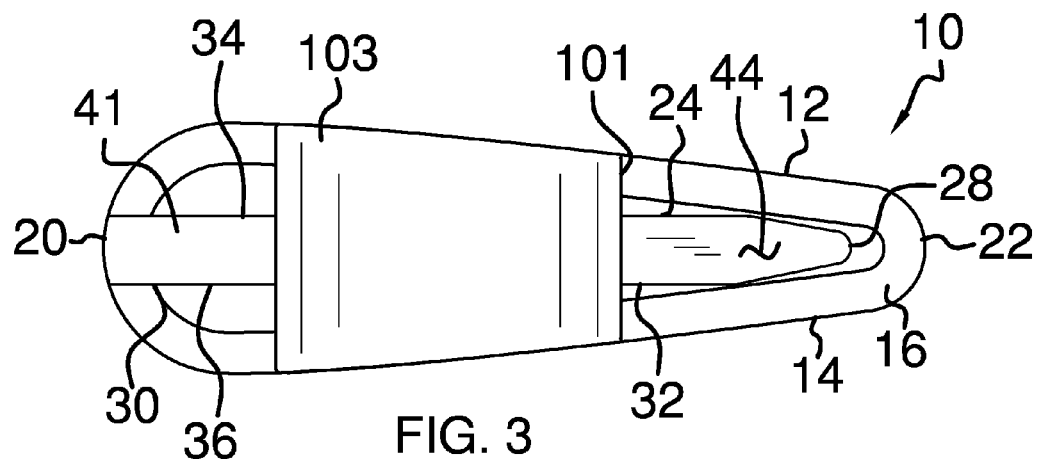
FIG. 3 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the eyewear storage assembly 10 generally comprises a clip 12 that has an exterior edge 14 extending between a top side 16 and a bottom side 18 of the clip 12. Each of a first end 20 and a second end 22 of the clip 12 is rounded. The clip 12 forms a closed loop. Moreover, the clip 12 is elongated between the first 20 and second 22 ends of the clip 12. The clip 12 has an ovoid shape A tab 24 has a coupled end 26 and a free end 28. The tab 24 is elongated between the coupled 26 and free 28 ends. Additionally, the coupled end 26 of the tab 24 is coupled to an inside surface 30 of the exterior edge 14 of the clip 12. The tab 24 is positioned proximate the first end 20 of the clip 12.

Each of a first lateral side 32 and a second lateral side 34 of an outer edge 36 of the tab 24 flares outwardly proximate the coupled end 26 of the tab 24. The coupled end 26 of the tab 24 has a width that is greater than the free end 28 of the tab 24. The free end 28 of the tab 24 is rounded.

The tab 24 has a bend 38 positioned proximate the coupled end 26 of the tab 24. The bend 38 defines an elevating portion 40 and a flat portion 42 of the tab 24. The elevating portion 40 of the tab 24 extends downwardly from the flat portion 42 of the tab 24. Moreover, the elevating portion 42 of the tab 24 extends upwardly from a rear tab portion 41. The rear tab portion 41 extends from the exterior edge 14 of the clip 12.

The flat portion 42 of the tab 24 is positioned upwardly from the top side 16 of the clip 12. An upper surface 44 of the flat portion 42 of the tab 24 lies on a plane that is not parallel with the top side 16 of the clip 12. The flat portion 42 of the tab 24 extends toward the second end 22 of the clip 12.

The clip 12 is slidably coupled to a brim 46 of an article of headgear 48. The brim 46 of the article of headgear 48 is positioned between the clip 12 and the tab 24. The article of headgear 48 may be a baseball cap of any conventional design.

Eyewear 50 is positionable between the clip 12 and an eyewear receptacle 101. The eyewear receptacle 101 is affixed atop of the clip 12. Moreover, the eyewear receptacle 101 is has a semi-circular curvature forming an opening 102. The opening 102 enables eyewear armatures 52 to slide therein.

Figure 4:
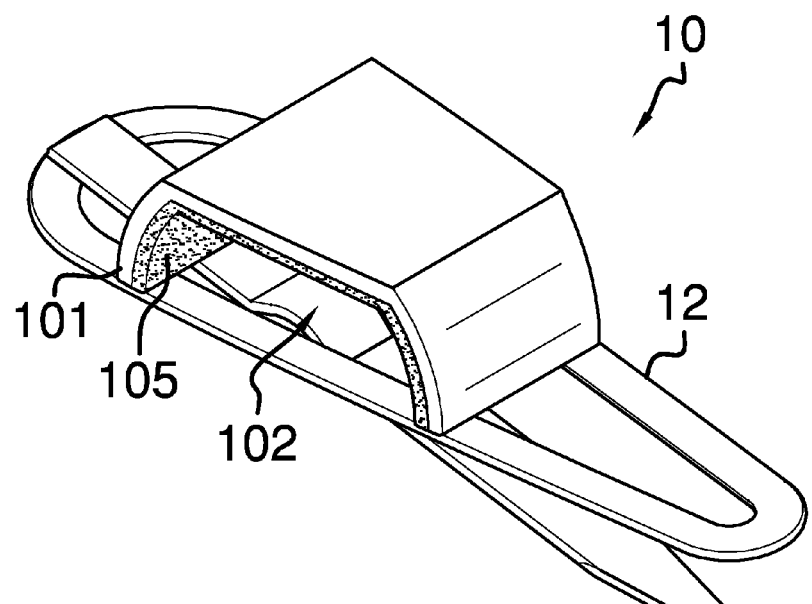
FIG. 4 is a perspective view of an alternative embodiment of the disclosure.
Figure 5:
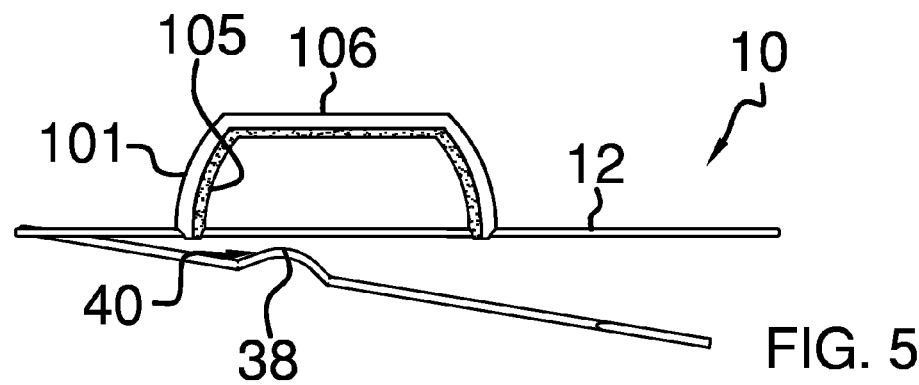
FIG. 5 is a right side view of an alternative embodiment of the disclosure.
Figure 6:
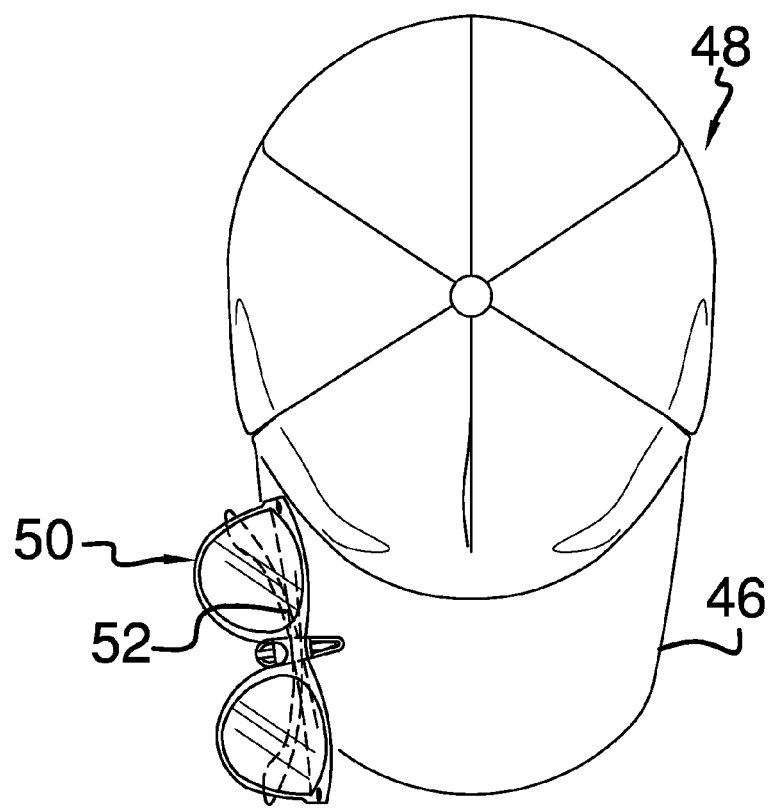
FIG. 6 is a top in-use view of an embodiment of the disclosure.
Figure 7:
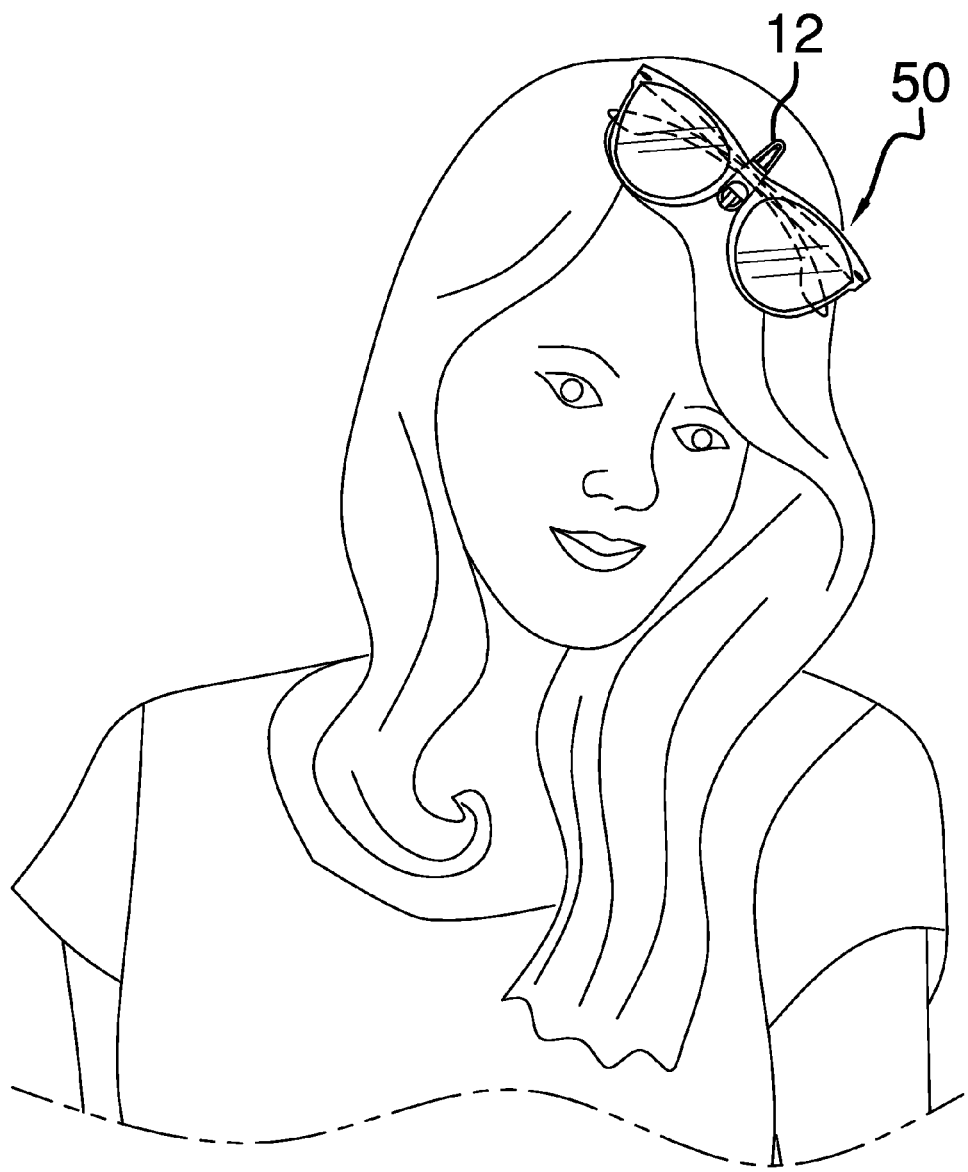
FIG. 7 is an in-use view of an embodiment of the disclosure.

Referring to FIGS. 4-5, the eyewear receptacle 101 may include a trapezoidal shape as opposed to the semi-circular curvature. The eyewear receptacle 101 of FIGS. 4-5 shall include a top flat surface 106, which is parallel with the clip 12.

The eyewear receptacle 101 is further defined with an outer surface 103 and an inner surface 104. The inner surface 104 includes a soft foam lining 105 to cushion the eyewear armatures 52.

The tab 24 retains the eyewear 50 on the brim 46 of the article of headgear 48. The eyewear 50 may be sunglasses of any conventional design.

In use, the clip 12 and the tab 24 are slidably coupled to the brim 46, and the eyewear receptacle 101 supports the article of headgear 48. The armatures 52 of the eyewear 50 are positioned inside of the opening 102 of the eyewear receptacle 101 when the eyewear 50 is to be stored. The clip 12 is left on the brim 46 of the article of headgear 48 while the eyewear 50 is being worn.

With respect to the above description, it is to be realized that the optimum dimensional relationship for the various components of the eyewear storage assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the eyewear storage assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An eyewear storage assembly for retaining the eyewear on an article of headgear, said assembly comprising:
   a clip having a tab, and the both of which being configured to be coupled to the article of head gear;
   said clip includes an eyewear receptacle coupled thereon;
   said eyewear receptacle is configured to support eyewear thereon such that the eyewear is retained on the article of headgear for storage;
   wherein the eyewear receptacle is affixed atop of the clip; wherein the eyewear receptacle has a semi-circular curvature forming an opening; wherein the opening enables eyewear armatures of said eyewear to slide therein;
   wherein the eyewear receptacle is affixed atop of the clip; wherein the eyewear receptacle includes a trapezoidal shape forming an opening wherein the opening enables eyewear armatures of said eyewear to slide therein; wherein the eyewear receptacle includes a top flat surface, which is parallel with the clip.

2. The assembly according to claim 1 wherein the clip has an exterior edge extending between a top side and a bottom side of the clip; wherein each of a first end and a second end of the clip is rounded; wherein the clip forms a closed loop.

3. The assembly according to claim 2 wherein the clip is elongated between the first and second ends of the clip; wherein the tab has a coupled end and a free end; wherein the tab is elongated between the coupled and free ends.

4. The assembly according to claim 3 wherein the coupled end of the tab is coupled to an inside surface of the exterior edge of the clip; wherein the tab is positioned proximate the first end of the clip.

5. The assembly according to claim 4 wherein each of a first lateral side and a second lateral side of an outer edge of the tab flares outwardly proximate the coupled end of the tab; wherein the coupled end of the tab has a width that is greater than the free end of the tab; wherein the free end of the tab is rounded.

6. The assembly according to claim 5 wherein the tab has a bend positioned proximate the coupled end of the tab; wherein the bend defines an elevating portion and a flat portion of the tab; wherein the elevating portion of the tab extends downwardly from the flat portion of the tab.

7. The assembly according to claim 6 wherein the elevating portion of the tab extends upwardly from a rear tab portion; wherein the rear tab portion extends from the exterior edge of the clip.

8. The assembly according to claim 7 wherein the flat portion of the tab is positioned upwardly from the top side of the clip; wherein an upper surface of the flat portion of the tab lies on a plane that is not parallel with the top side of the clip; wherein the flat portion of the tab extends toward the second end of the clip.

9. The assembly according to claim 8 wherein the clip is slidably coupled to a brim of said article of headgear; wherein the brim of the article of headgear is positioned between the clip and the tab.

10. The assembly according to claim 9 wherein the eyewear receptacle is further defined with an outer surface and an inner surface; wherein the inner surface includes a soft foam lining to cushion eyewear armatures of said eyewear.

11. An eyewear storage assembly for retaining the eyewear on an article of headgear, said assembly comprising:
    a clip having a tab, and the both of which being configured to be coupled to the article of head gear;
    said clip includes an eyewear receptacle coupled thereon;
    said eyewear receptacle is configured to support eyewear thereon such that the eyewear is retained on the article of headgear for storage;
    wherein the clip has an exterior edge extending between a top side and a bottom side of the clip; wherein each of a first end and a second end of the clip is rounded; wherein the clip forms a closed loop;
    wherein the clip is elongated between the first and second ends of the clip; wherein the tab has a coupled end and a free end; wherein the tab is elongated between the coupled and free ends;
    wherein the coupled end of the tab is coupled to an inside surface of the exterior edge of the clip; wherein the tab is positioned proximate the first end of the clip; wherein each of a first lateral side and a second lateral side of an outer edge of the tab flares outwardly proximate the coupled end of the tab;
    wherein the coupled end of the tab has a width that is greater than the free end of the tab; wherein the free end of the tab is rounded;
    wherein the tab has a bend positioned proximate the coupled end of the tab; wherein the bend defines an elevating portion and a flat portion of the tab; wherein the elevating portion of the tab extends downwardly from the flat portion of the tab;
    wherein the elevating portion of the tab extends upwardly from a rear tab portion;

wherein the rear tab portion extends from the exterior edge of the clip;

wherein the flat portion of the tab is positioned upwardly from the top side of the clip; wherein an upper surface of the flat portion of the tab lies on a plane that is not parallel with the top side of the clip; wherein the flat portion of the tab extends toward the second end of the clip; wherein the clip is slidably coupled to a brim of said article of headgear; wherein the brim of the article of headgear is positioned between the clip and the tab;

wherein the eyewear receptacle is affixed atop of the clip; wherein the eyewear receptacle has a semi-circular curvature forming an opening; wherein the opening enables eyewear armatures of said eyewear to slide therein.

12. The assembly according to claim 11 wherein the eyewear receptacle is affixed atop of the clip; wherein the eyewear receptacle includes a trapezoidal shape forming an opening wherein the opening enables eyewear armatures of said eyewear to slide therein; wherein the eyewear receptacle includes a top flat surface, which is parallel with the clip.

13. The assembly according to claim 11 wherein the eyewear receptacle is further defined with an outer surface and an inner surface; wherein the inner surface includes a soft foam lining to cushion eyewear armatures of said eyewear.

* * * * *